Oct. 3, 1950  G. O. WILKINSON  2,524,502
BIRD FEEDER
Filed July 8, 1947
FIG. 1
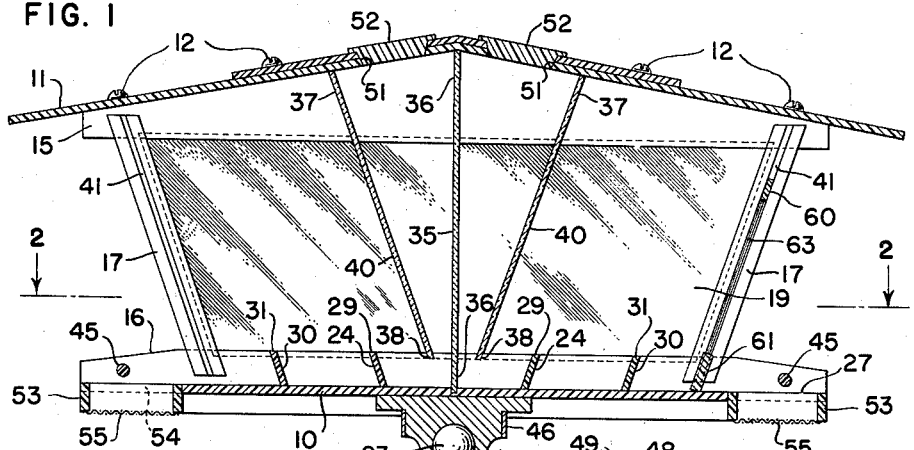
FIG. 2
FIG. 4
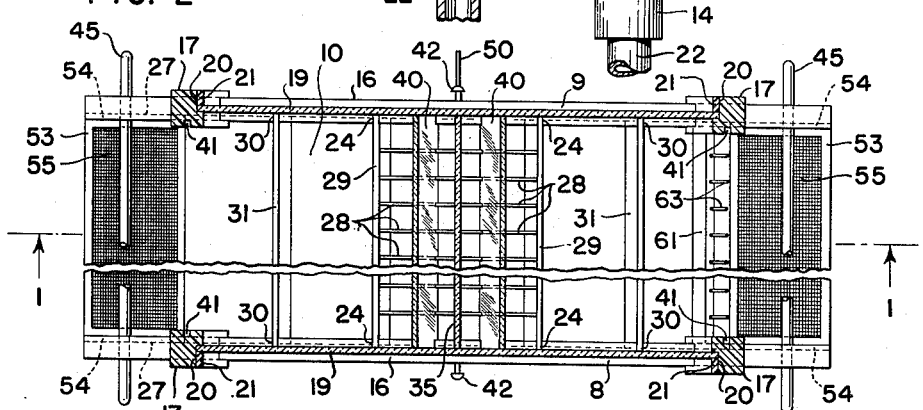
FIG. 3
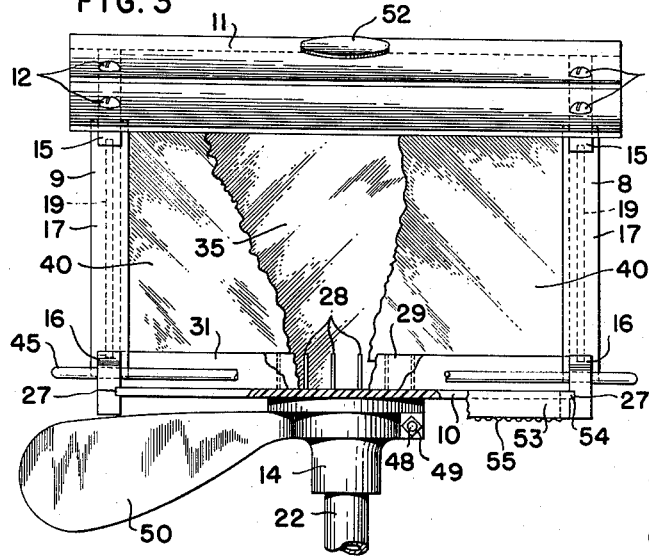
FIG. 5
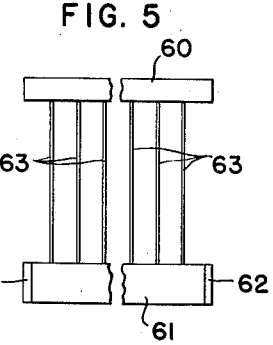
*INVENTOR.*
GORDON O. WILKINSON
BY
*G. T. Wobensmith*
ATTORNEY.

Patented Oct. 3, 1950

2,524,502

UNITED STATES PATENT OFFICE 2,524,502

BIRD FEEDER

Gordon O. Wilkinson, Ardmore, Pa.

Application July 8, 1947, Serial No. 759,573

9 Claims. (Cl. 119—51)

This invention relates to bird feeders of the type adapted to be erected in gardens or on lawns, and more particularly to improvements in such bird feeders in which the feed is adequately protected from rain, snow and wind.

It is the principal object of the present invention to provide a bird feeder of the character aforesaid which will be attractive in appearance, which will require a minimum of care for use in year-round feeding of birds, and in which it is possible for the birds to feed regardless of the weather or the season.

It is a further object of the present invention to provide a bird feeder for gardens and lawns in which a high degree of visibility of the interior is provided, so that the birds may be readily observed while feeding.

It is a further object of the present invention to provide a bird feeder for gardens and lawns in which a large quantity of feed may be provided, thereby reducing the necessity for constant attention.

It is a further object of the present invention to provide a bird feeder for gardens and lawns in which waste of the feed, both by reason of the wind and by reason of the feeding habits of the birds, is reduced to a minimum.

It is a further object of the present invention to provide a bird feeder for gardens and lawns which may be modified, as desired, by the user to provide a feeder accessible from one or both ends, and in which, if desired, different types of feed may be supplied simultaneously.

It is a further object of the present invention to provide a bird feeder for gardens and lawns which may be provided, as desired, with guards for preventing the access of large birds, such as blue jays, and with trays for preventing the scattering of hulls and husks from the feed.

Other advantageous features will be apparent from the specification and claims.

The nature and characteristic features of the invention will be more readily understood from the following description, taken in connection with the accompanying drawings forming part hereof, in which:

Figure 1 is a vertical sectional view of a preferred embodiment of the bird feeder of the present invention, taken approximately on the line 1—1 of Fig. 2;

Fig. 2 is a horizontal sectional view taken approximately on the line 2—2 of Fig. 1;

Fig. 3 is a side elevational view of the bird feeder shown in Figs. 1 and 2, parts being broken away to show the details of construction;

Fig. 4 is a fragmentary elevational view showing the clamp for the wind vane; and Fig. 5 is a view in elevation of the large bird guard.

It should, of course, be understood that the description and drawings herein are illustrative merely, and that various modifications and changes may be made in the structure disclosed without departing from the spirit of the invention.

Referring more particularly to the drawings, the bird feeder, in accordance with the present invention, preferably includes front and rear side walls 8 and 9, and a bottom wall or floor 10. A roof 11 is also provided and is held in position by screws 12 and preferably has a downward inclination from the center towards each side and an overhang beyond the lower portions of the bird feeder. The bird feeder is preferably provided, on the bottom wall or floor 10 with a suitable socket 14 having a downwardly extending portion for positioning on a vertical tubular post 22, a ball 23 being interposed between the upper end of the post 22 and the socket 14. This mounting of the feeder permits of turning with the wind.

Each of the front and rear walls 8 and 9 consists of an upper rail 15, a lower horizontal rail 16, and inclined side rails 17, which may be made of any desired material, such as separate pieces of wood, suitably secured together, or, if desired, the rails may be molded as a unit of any suitable weather-proof synthetic plastic material. Each of the front and rear walls 8 and 9 is also provided with a transparent panel 19 which may be made of glass or transparent synthetic plastic sheet material secured in position in any desired manner. One suitable mode of mounting the transparent panel 19 is to provide suitable grooves 20 in the rails 15, 16 and 17 with molding strips 21 secured to the rails 15, 16 and 17 for holding the panel 19 in position, as indicated in Fig. 2.

The bottom wall or floor 10 preferably comprises a plate having the edges extending into grooves 27 in the bottom rails 16, the edges being secured in the grooves 27 in any desired manner. The bottom wall 10 preferably terminates at the lower ends of the side rails 17, and is provided with a plurality of transversely disposed spaced partitions 28 which are adapted to be closed at their outer ends by inclined partition walls 29 which may be mounted in inclined grooves 24 in the bottom rails 16, or may, if desired, be integral. The lower rails 16, between the partition walls 29 and the outer ends of the floor 10, are provided with a plurality of slots 30 for the insertion of strips 31 in the desired location and parallel to the walls 29 for preventing scattering and waste of food, as hereinafter explained.

A removable central panel 35 is preferably provided extending from the roof 11 to the floor 10, the upper rails 15 and the lower rails 16 being provided with slots 36, so that the panel 35 can extend from the interior face of the front wall 8 to the interior face of the rear wall 9. The partitions 28 are also slotted so that the panel 35 is in engagement with the floor 10, for purposes to be explained. The central partition panel 35 is preferably made of transparent material, such as glass or transparent synthetic plastic sheet material.

The upper rails 15 and the lower rails 16 of the front and rear walls 8 and 9 are each provided with a plurality of inclined slots 37 and 38 for the insertion of inclined hopper walls 40 which are also preferably made of transparent material, such as glass or synthetic plastic sheet material. The hopper walls 40, at their lower ends, preferably terminate at the upper ends of the partitions 28.

The upper rails 15, near their outer extremities, and the lower rails 16, at locations spaced inwardly from their ends, are provided with inclined slots 41 for the insertion, if desired, of a transparent wall panel of glass or synthetic plastic sheet material, or for other purposes, as hereinafter explained. The upper rails 15 may also have, on the exterior thereof, studs 42 for hanging other feeders or other kinds of feed.

Each of the lower rails 16 extends outwardly beyond the ends of the floor 10, and is adapted to have a perch rod 45 mounted therein upon which the birds may alight upon their arrival or for aid in the departure of the birds after feeding.

The socket 14 is preferably provided with a clamp 46, held in position by a bolt 48 and nut 49, for supporting and clamping a vane 50 by which the feeder is positioned with the front wall facing into the wind, as hereinafter explained.

The roof 11 is provided with a plurality of openings 51 closed by suitable water-tight closure members 52 for the introduction of feed into the spaces between the hopper panels 40 and the central partition panel 35.

In the space between the lower rails 16 and beyond the ends of the floor 10 a tray 53 may be provided having side projections 54 for engagement in the grooves 27. The tray 53 preferably has a bottom wall 55 of screening for retaining husks, shells and the like removed from the feed by the birds.

If desired, and in order to prevent access of large birds, such as blue jays, a guard frame of wire may be provided having an upper horizontal portion 60 and having a lower horizontal portion 61 with reduced ends 62 for engagement in the slots 41 in the rails 17. Vertically disposed wire sections 63 extend between the portions 60 and 61 and are spaced to prevent the entrance of larger birds, such as blue jays.

When the bird feeder, in accordance with the present invention, is mounted on a suitable tubular supporting post 22, the same is free to rotate upon the ball 23 in the socket 14 as determined by the wind striking the vane 50. The front wall 8 is thus positioned by the wind so as to face the wind and the rear wall 9 is positioned away from the wind. The birds may then have access to the interior at each side for feeding, and while feeding, may be readily observed through the transparent panels 19.

Feed may be supplied through the closures 52 in the roof 11 to the hoppers on each side of the central panel 35 for gravity feed. The provision of the two hoppers permits of the use, if desired, of different kinds and sizes of feed and the capacity of the hoppers is such that an ample supply may be provided, permitting feeding over several weeks without refilling. At the same time, the feed is retained in dry condition and is protected from wind, rain and snow. The feed in the hoppers is fed by gravity and is delivered to the spaces between the partition walls 28, the walls 29 preventing overflowing. The spaces on the floor 10 between the walls 29 and the guard strip 31 provide places for the birds to stand while feeding.

The partition walls 28, also, above the floor 10, confine the feed and prevent sidewise displacement. The guard strips 31 prevent undesired scattering and waste of the feed by the birds during feeding.

The central panel 35 prevents cross currents of air from one side thereof to the other. If, however, a single hopper is desired and the wind velocity is not excessive, the central panel 35 may be removed, thus providing a single large hopper.

If desired also, the hopper walls 40 may be removed, the central panel 35 being left in position and the feed placed on the floor 10 in the spaces between the partition walls 28 and between the walls 29. More frequent attention is required however, with this arrangement to insure an adequate supply of feed.

The perches 45, located within the outer ends of the roof 11, are available for the landing of the birds on their arrival and aid in the departure of the birds. The trays beneath the perches serve as collectors for the husks and hulls of the feed and obviate the scattering of refuse on the ground around the feeder.

The large bird guard shown in Figs. 1 and 5, when mounted in the slots 41, permits of access by the smaller birds and effectually prevents the entrance of the larger birds.

If desired, one of the sets of slots 41 at one side may also be utilized for the mounting of a transparent panel, although this reduces the available floor space for feeding.

I claim:

1. In a bird feeder, a house comprising a pair of spaced vertical walls each having an upper rail, a lower horizontal rail, end rails extending between said upper and lower rails, and a solid side wall panel of transparent material in the space between the rails, a floor between said lower rails, a roof carried by the upper rails and extending outwardly beyond the upper ends of the end rails, said upper and lower rails having facing vertical slots and a vertical panel in said slots centrally disposed and extending from the roof to the floor and from one side wall to the other side wall.

2. In a bird feeder, a house comprising a pair of spaced vertical walls each having an upper rail, a lower horizontal rail, outwardly inclined end rails extending between said upper and lower rails, and a solid side wall panel of transparent material in the space between the rails, a floor between said lower rails terminating adjacent the lower ends of the end rails, a roof carried by the upper rails and extending outwardly beyond the upper ends of the end rails, feed supplying means in the interior space between said walls and intermediate the ends of the lower horizontal rails, the lower rails having end portions extending beyond said floor, and a perch rod extending between said rail end portions.

3. In a bird feeder, a house comprising a pair of spaced vertical walls each having an upper rail, a lower horizontal rail, outwardly inclined end rails extending between said upper and lower rails, and a solid side wall panel of transparent material in the space between the rails, a floor between said lower rails terminating adjacent the lower ends of the end rails, a roof carried by the upper rails and extending outwardly beyond the upper ends of the end rails, feed supplying means in the interior space between said walls, the lower rails having end portions extending beyond said floor, a perch rod extending between said rail end portions, and a removable tray between said rail end portions below said perch rod.

4. In a bird feeder, a house comprising a pair of spaced vertical walls each having an upper rail, a lower horizontal rail, outwardly inclined end rails extending between said upper and lower rails, and a solid side wall panel of transparent material in the space between the rails, a floor between said lower rails terminating adjacent the lower ends of the end rails, a roof carried by the upper rails and extending outwardly beyond the upper ends of the end rails, feed supplying means in the interior space between said walls and intermediate the ends of the lower horizontal rails, the lower rails having end portions extending beyond said floor and the inner portions thereof having facing slots, and a tray between said rail end portions carried in said slots.

5. In a bird feeder, a house comprising a pair of spaced vertical walls each having an upper rail, a lower horizontal rail, end rails extending between said upper and lower rails, and a transparent panel in the space between the rails, a floor between said lower rails, a roof carried by the upper rails and extending outwardly beyond the upper ends of the end rails, a vertical panel centrally disposed and extending from the roof to the floor and from one side wall to the other side wall, said upper and said lower rails having pairs of inclined facing slots and inclined panels removably mounted in said slots and terminating above the lower edge of the vertical panel and providing therewith a plurality of centrally disposed feed hoppers.

6. In a bird feeder, a house comprising a pair of spaced vertical walls each having an upper rail, a lower horizontal rail, end rails extending between said upper and lower rails, and a solid side wall panel of transparent material in the space between the rails, a floor between said lower rails, a roof carried by the upper rails and extending outwardly beyond the upper ends of the end rails, and spaced panels in the interior space between said side walls and extending to said roof for retaining feed for delivery onto said floor and preventing access of air from one side of said spaced panels to the other side thereof.

7. In a bird feeder, a house comprising a pair of spaced vertical walls each having an upper rail, a lower horizontal rail, end rails extending between said upper and lower rails, and a solid side wall panel of transparent material in the space between the rails, a floor between said lower rails, a roof carried by the upper rails and extending outwardly beyond the upper ends of the end rails, feed supplying means in the interior space between said walls for the delivery of feed onto said floor, and partitions on said floor for preventing the spreading of the feed.

8. In a bird feeder, a house comprising a pair of spaced vertical walls each having an upper rail, a lower horizontal rail, end rails extending between said upper and lower rails, and a solid wall panel of transparent material in the space between the rails, a floor between said lower rails terminating adjacent the lower ends of the end rails, a roof carried by the upper rails and extending outwardly beyond the upper ends of the end rails, feed supplying means in the interior space between said walls, and said end rails having facing slots for the mounting therein of a closure member.

9. In a bird feeder, a house comprising a pair of spaced vertical walls each having an upper rail, a lower horizontal rail, end rails extending between said upper and lower rails, and a solid side wall panel of transparent material in the space between the rails, a floor between said lower rails terminating adjacent the lower ends of the end rails, a roof carried by the upper rails and extending outwardly beyond the upper ends of the end rails, feed supplying means in the interior space between said walls, said end rails having facing slots therein, and a guard mounted in said slots for preventing the access of birds in excess of a predetermined size to said feed supplying means.

GORDON O. WILKINSON.

REFERENCES CITED

The following references are of record in the file of this patent:

UNITED STATES PATENTS

| Number | Name | Date |
| --- | --- | --- |
| D. 120,350 | Moore | May 7, 1940 |
| 138,396 | Gunther | Apr. 29, 1873 |
| 501,088 | Leaver | July 11, 1893 |
| 1,116,632 | Schleicher | Nov. 10, 1914 |
| 2,349,868 | Hyde | May 30, 1944 |
| 2,422,438 | Richards | June 17, 1947 |

FOREIGN PATENTS

| Number | Country | Date |
| --- | --- | --- |
| 296,916 | Great Britain | Sept. 13, 1928 |

OTHER REFERENCES

"Handy Man's Home Manual", 1935 edition, published by Modern Mechanix Publishing Co. Page 63.

Pacific Rural Press, Nov. 1, 1941, page 289.